T. J. LEVEY.
BOTTLE CAPPING MACHINE.
APPLICATION FILED OCT. 18, 1909.
Reissued Dec. 28, 1909.
13,065.
2 SHEETS—SHEET 1.
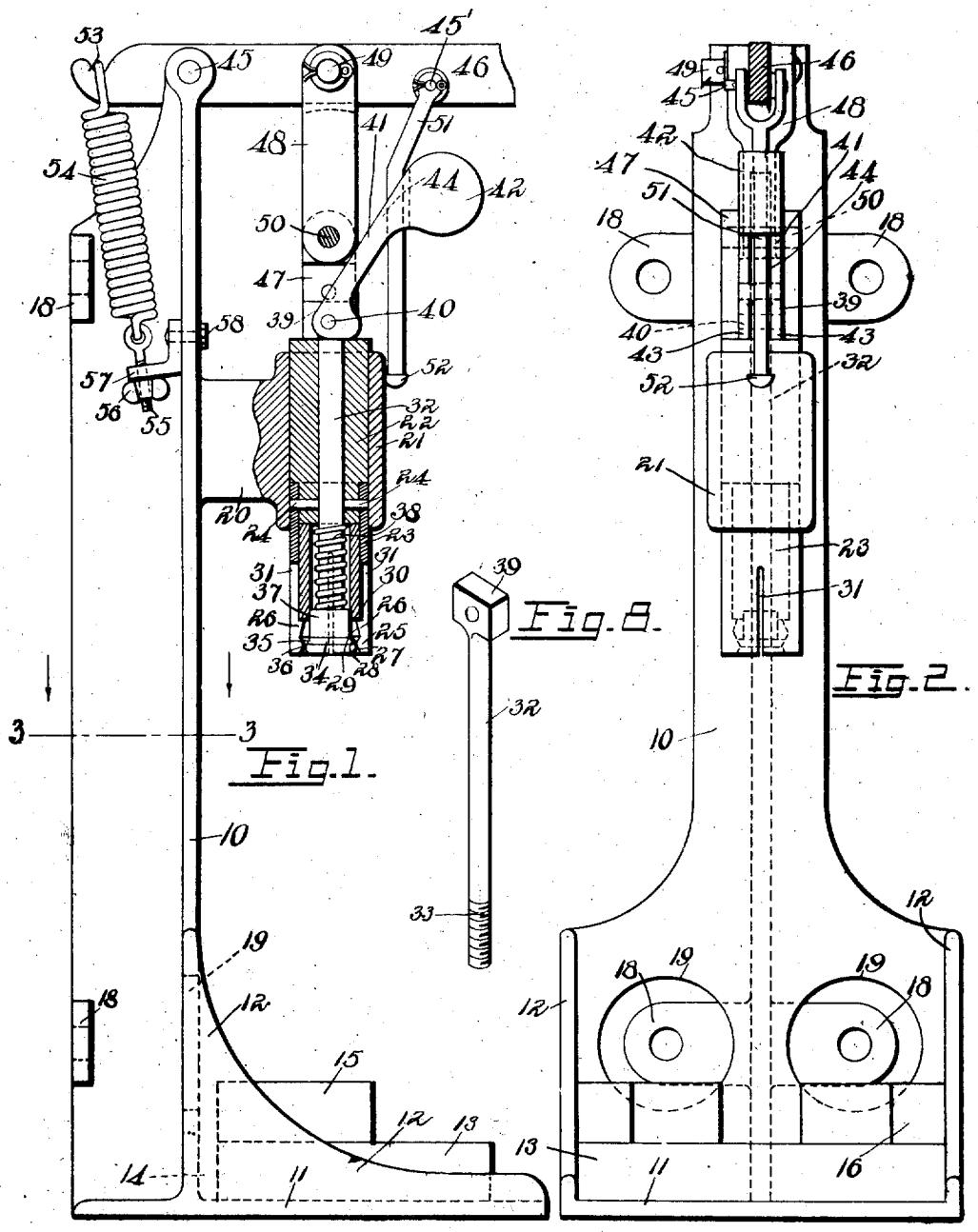
Witnesses
Byron B. Collings.
Jas. E. Dodge.
Inventor
T. J. Levey by
Williamson Fisher &
Williamson
Attorneys.

T. J. LEVEY.

BOTTLE CAPPING MACHINE.

APPLICATION FILED OCT. 18, 1909.

Reissued Dec. 28, 1909.

13,065.

2 SHEETS—SHEET 2.

Witnesses
Byron B. Collings.
Jas. E. Dodge

Inventor
T. J. Levey by
Williamson Fisher &
Williamson
Attorneys

UNITED STATES PATENT OFFICE.

THOMAS J. LEVEY, OF WASHINGTON, DISTRICT OF COLUMBIA, ASSIGNOR, BY DIRECT AND MESNE ASSIGNMENTS, TO THE INTERNATIONAL CAP AND SEALING-MACHINE COMPANY, A CORPORATION OF MARYLAND.

BOTTLE-CAPPING MACHINE.

13,065. Specification of Reissued Letters Patent. Reissued Dec. 28, 1909.

Original No. 894,797, dated July 28, 1908, Serial No. 382,261. Application for reissue filed October 18, 1909. Serial No. 523,365.

*To all whom it may concern:*

Be it known that I, THOMAS J. LEVEY, a citizen of the United States, residing at Washington, District of Columbia, have invented certain new and useful Improvements in Bottle-Capping Machines; and I do hereby declare the following to be a full, clear and exact description of the invention, such as will enable others skilled in the art to which it appertains to make and use the same.

This invention relates to bottle capping machines, and has for its object to improve the construction and to increase the efficiency and utility of devices of this character.

With this and other objects in view, the invention consists in certain novel features of construction as hereafter shown and described and then specifically pointed out in the claims.

Figure 4:
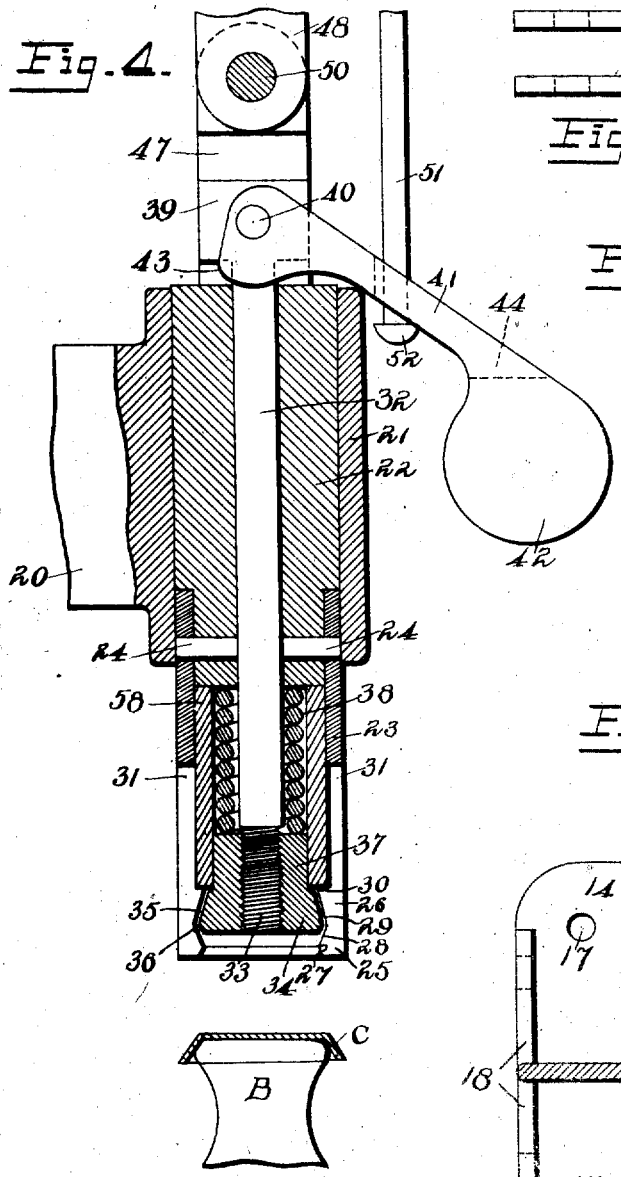
Figure 5:
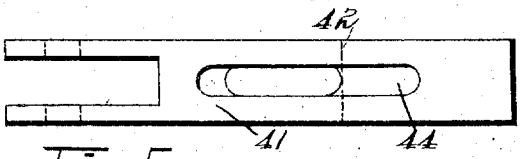
Figure 6:
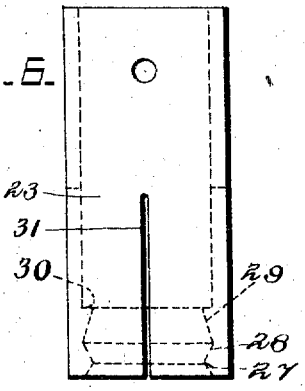
Figure 7:
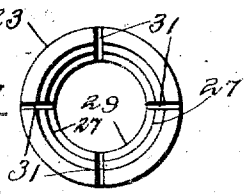
Figure 3:
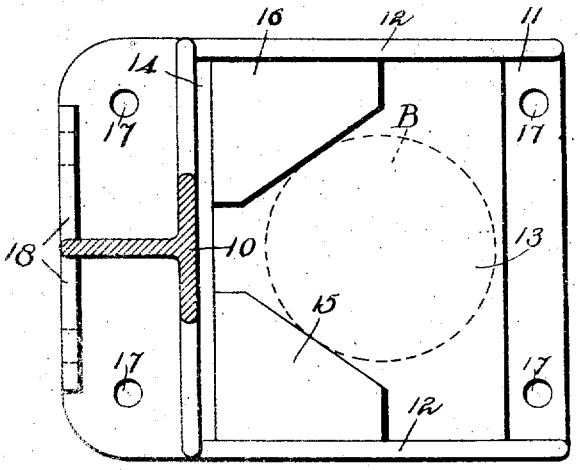

In the drawings employed for illustrating an embodiment of the invention, Figure 1 represents a side elevation, partly in section, of the improved apparatus; Fig. 2 is a front elevation of the improved apparatus with the operating lever in section; Fig. 3 is a transverse section on the line 3—3 of Fig. 1; Fig. 4 is an enlarged sectional detail of the main operating portion of the device; Fig. 5 is a detached detail view enlarged, of the weighted lever arm; Fig. 6 is a side elevation, enlarged, of the tubular capping member; Fig. 7 is a bottom plan view of the tubular capping member; and Fig. 8 is a perspective view of the plunger rod of the capping mechanism detached.

The improved device is designed to be employed for attaching metal caps to bottles and like receptacles, more particularly to bottles and like receptacles containing effervescent liquids or liquids under pressure, and for the purpose of illustration, the device is shown arranged for applying caps of this character to the conventional form of bottle, a portion of one of which is shown in connection with Fig. 4.

The improved device comprises a supporting standard 10, preferably ribbed as represented in Fig. 3, to secure the requisite strength without adding undue weight, and with a laterally extending base or foot 11. Webs 12 are arranged between the vertical portion 10 and the base portion 11, and between these webs and bearing upon the base portion is a block 13 preferably of wood, and upon which the bottle to be capped is disposed. The block 13 is arranged with its rear edge spaced away from the front of the standard portion 10, to leave a cavity 14 into which fragments of glass or other material which may be accidentally broken off from the bottles will find their way, and thus avoid encumbering the block 13. Disposed upon block 13 are two stop blocks 15—16, having their contiguous faces reversely inclined and against which the bottle B bears as indicated by the dotted circle in Fig. 3, the two members 15—16, thus positioning the bottle accurately beneath the capping mechanism.

The base member 11 is provided with numerous apertures 17 to receive holding bolts or screws to enable the base with its standard 10 to be secured to a suitable foundation, when it is desired to so support the device, and the standard 10 is provided with lateral wings 18 provided with bolt or screw receiving apertures, to enable the device to be attached to a vertical wall or other support if desired. Opposite the lower pair of the lateral wings 18 the standard 10 is provided with large apertures 19 through which a wrench or screw driver may be inserted in applying the holding screws or bolts. By this means the device may be used in any desired manner.

Extending forwardly of the standard 10 intermediate its ends is a web 20 to the outer end of which is secured an integral sleeve 21, said sleeve receiving and forming a working barrel for a plunger 22. The plunger 22 is reduced at its lower end to receive a tubular capping member 23, the capping member being secured in place by transverse pins 24 extending through the cap member and into the reduced portion of the plunger as clearly shown in Figs. 1 and 4.

The tubular capping member 23 is formed with two integral annular ribs 25—26, the rib 26 being slightly larger than the rib 25, or with the inner diameter of the rib 25 slightly larger than the inner diameter of the rib 26, the ribs being connected by inclined faces or portions, as shown more clearly in Fig. 4. By this arrangement the inner surface of the tubular capping member 23 at the open end is first inclined inwardly at a relatively sharp incline for a relatively short distance, then inclined outwardly at a longer incline, and then inclined inwardly again at a still longer incline, terminating at the upper edge of the rib 26, and thence extending horizontally to the main inner face of the tubular member. For the purpose of clearness in the description of the operation, the lower rib formed at the junction of the upper and lower inclined portions of the rib 25 is designated 27, the upper inclined portion of the rib 25 is designated 28, the longer inclined portion of the rib 26 is designated 29, while the square or lateral shoulder of the rib 26 is designated 30. The lower portion of the tubular capping member 23 including the ribs 25—26 is formed with a plurality of slits represented at 31, and extending longitudinally of the tubular capping member from its lower end for approximately one-half its length, so that the cleft lower portion of the member 23 may be distended under pressure during the capping operation, as hereafter explained.

The plunger 22 is formed with an internal longitudinal aperture, and slidably disposed in this aperture is a rod 32, the lower end of the rod is threaded as at 33 to receive a capping head 34, the outer annular surface of the lower portion of the head 34 being cylindrical and the upper portion inclined inwardly and conforming substantially to the inclined surface 29 of the member 23, but of less diameter than the same. The cylindrical portion of the head 34 is preferably equal to the internal diameter of the rib 25, so that when the head 34 is in its lowest position, as shown in Fig. 1, the largest diameter of the head 34 will closely engage the inner surface of the rib 25, which surface has been called rib 27 above, the object to be hereafter explained.

The head 34 is formed with an upwardly extending sleeve or extension 37, and bearing between this sleeve and the lower face of the reduced portion of the plunger 22 is a spring 38 operating to maintain the head 34 and its connected rod 32 yieldably in their lower position. The upper end of the rod 32 above the plunger 22 is formed with a T-head 39, Fig. 8, and pivoted at 40 to this T-head is a lever 41, bifurcated at its inner end to bear upon opposite sides of the T-head 39 and with a weight 42 at its free outer end. The lever 41 is formed with cam faces 43 upon its bifurcated portion adapted to bear upon the upper face of the plunger 22, the lever 41 being also provided with an elongated slot 44, the object to be hereafter explained.

Pivoted at 45 in the upper end of the standard 10 is an operating lever 46, and the plunger 22 is provided with an upwardly extending shank or stem 47 coupled by a link 48 to the lever 46; a pin 49 joins the link to the lever 46, and a pin 50 joins said link to the stem 47. By this arrangement it will be obvious that the vertical movement of the lever 46 will operate the plunger 22. Depending from the lever 46 is a rod 51, pivoted to said lever at 45′ the rod extending through the slot 44 of the lever 41 and with an enlarged head 52 at its lower end, the head preventing the rod 51 from being disengaged from the slot in the lever 41. The lever 46 extends rearwardly of the standard 10 for a short distance and is formed with a terminal hook 53 to receive one end of a spring 54, the lower end of the spring being connected to a threaded rod 55 provided with a wing nut 56 bearing beneath a bracket 57 attached as by a bolt 58 to the standard 10. The spring 54 operates to return the lever 46 and the plunger 22 to their normal elevated positions, and the threaded rod 55 and its nut 56 enable the tension of the spring to be regulated as required.

With a device thus constructed the operation is as follows: the metal caps *c*, which are to be attached to the bottle B are provided in blank, either as flat disks or as cup shaped members, the bent edges of the disks being relatively slight, and one of these partially formed cap members or a flat disk as the case may be, is placed upon a bottle mouth and the bottle disposed upon the block 13 and against the blocks 15—16 with its upper end beneath the lower edge of the slitted or cleft member 23, the parts being in the position shown in Fig. 1. As shown in Fig. 1 of the drawings, the parts are in the position they assume when the tubular capping member 23 has engaged the cap C, and the head 34 is resting upon said cap. In this position, the operating lever 46 has been moved downwardly from the incline at which it normally rests when in the inactive position, to a position substantially horizontal as shown in said Fig. 1. This downward movement of the operating lever 46 will move the capping member in position over the cap C, and upon a further downward movement the said cap will be permitted to enter the capping member owing to the spring action of the cleft or slitted member 25 carrying the crimping rib 27 as will be more fully explained below. The head 34 will be permitted to move down to the position shown in Fig. 1, owing to sufficient clearance being provided for such movement by the inclined surfaces 28 and 29 as explained above. The head 34 being in firm engagement with the metal of the cap as above explained a further downward movement will cause the cork carried by the cap to be compressed between the extreme upper rim of the bottle and said head and to thereby form a tight joint between the said rim and said cork. But as is well known in bottle capping machines of this nature, the further crimping of the flange of the cap under the shoulder on the bottle neck is liable to cause the metal to buckle unevenly and after the capping member is removed the unequal strains thus produced are liable to destroy the tight joint originally made between the cork and the extreme upper rim of the bottle. In order to prevent this I have provided the cleft capping member 23, having the spring fingers and have furnished these fingers with the crimping ribs 27, so that while the head 34 presses firmly on the metal of the cap and prevents it from buckling upwardly, these crimping ribs 27 wipe down along the flange of the cap pulling and stretching the metal as they descend, so that all buckling of the metal is effectually taken up, and finally after the lower rim of the shoulder on the bottle head is passed these crimping ribs 27, by the spring pressure inherent in the parts of the member 23, snap in under said rim and thereupon firmly secure the cap in its stretched condition on the bottle-head. Owing to this wiping and stretching or glove fitting action so to speak of the crimping ribs 27, combined with the firm downward pressure of the head 34 which causes the cork in the cap to be forced down and to be grooved or bitten into by the extreme upper lip of the bottle a gas tight seal of a very high efficiency is produced on the bottle. The final downward and inward movements of the crimping ribs 27 into the position shown in Fig. 4, are possible owing to the clearance spaces between the head 34 and the parts 28 and 29 as above mentioned. Upon this final downward movement of the capping member 23, the head 34 with its rod 32 remains stationary, while the weighted end 42 of the lever 41 follows the downward movement of the plunger and capping member, until, when the extreme lower position of the capping member is reached, the lever has assumed the position shown in Fig. 4 of the drawings, and, bearing by its cam surfaces 43 constantly upon the upper face of the plunger, the parts are locked in the position shown. In this position of the parts the capping of the bottle has been completed. When the capping operation is completed, and pressure on the operating lever 46 is relieved, the spring 54 acts to return the operating lever to its elevated position, and during the upward movement of said lever 46, the head 52 of the rod 51 coming in engagement with lever 41, lifts this lever and returns it along with the lever 46, to the elevated position, releasing the compression on spring 38, and allowing this spring to act to force the head 34 downward to the position shown in Fig. 1, the capping member moves off the capped bottle, the parts have been restored to their normal position and are ready for the capping of another bottle.

Disposed within the tubular member 23 and between the tubular member and the extension 37 of the head member 34 is a stop sleeve 58, which is supported on the lateral shoulder 30 of the inclined portion 29, this spring 38 being disposed between this stop sleeve and the stem 32, as shown in Fig. 4. The stop sleeve thus serves to prevent lateral movement of the parts under the severe strains to which devices of this character are liable to be subjected.

The improved device may be arranged to be operated manually, by a foot treadle, or steam or other power, as may be required, and I do not wish therefore, to be limited to any specific operating means.

Having thus described the invention, what is claimed as new is:

1. In a device of the class described, a plunger movably disposed, a tubular member having spaced clefts and depending from said plunger, a head member within said tubular member and having a stem extending through said plunger, a spring between said head member and plunger and operating to maintain the plunger and head member yieldable relative to each other, means for operating said plunger, and means for locking said plunger relative to said stem and its connected head member.

2. In a device of the class described, a supporting frame having a plunger guide, a plunger movable through said guide, a tubular member depending from said plunger and provided with spaced longitudinal clefts, a head member within said tubular member and having a stem extending through said plunger, an operating lever swinging upon said frame, coupling means between said plunger and lever, a weighted locking lever swinging upon said stem and provided with cam faces adapted to lock said plunger relative to said stem and its attached head member when the locking lever is in its downward position, and means connected to said operating lever whereby the locking lever is released at the upward movement of the operating lever.

3. In a device of the class described, a supporting frame having a plunger guide, a plunger movable through said guide and provided with spaced arms extending from its upper end, a tubular member depending from said plunger and provided with spaced longitudinal clefts, a head member within said tubular member and having a stem extending through said plunger and provided with lateral extensions at the upper end and bearing upon said plunger, an operating lever swinging upon said frame, a link pivoted between said spaced arms at one end and coupled to the operating lever at the other end, a weighted locking lever bifurcated at one end and bearing upon opposite sides of the laterally extended end of said stem and between said end and said spaced arms and provided with cam faces adapted to lock said plunger relative to said stem and its attached head member when the locking lever is in its downward position, a pivot pin coupling said locking lever to said stem, and a rod swinging at one end from said operating lever and extending through said locking lever and provided with a lateral enlargement at its free end.

4. In a device of the class described, a supporting frame having a plunger guide, a plunger movable in said guide and provided with spaced arms at its upper end, a tubular member depending from said plunger and provided with spaced longitudinal clefts, a head member within said tubular member and provided with a stem extending through said plunger and with a laterally extending upper end adapted to bear upon said plunger, a spring between said head member and said plunger and operating to maintain said plunger and head member yieldable relative to each other, an operating lever pivoted to said frame, a spring operating to maintain said operating lever yieldably in its elevated position, a link swinging at one end between said plunger arms and at the other end from said operating lever, a weighted locking lever swinging from said stem and between said plunger arms and provided with cam faces adapted to lock said plunger in its downward position, and a rod swinging from said operating lever and extending through said locking lever and provided with an enlargement at its free end adapted to engage the locking lever and release the same when the operating lever is returned to its upward position.

5. In a bottle capping machine, the combination with a support, of a vertically movable capping member embodying a plunger, a tubular member carried by said plunger and provided with longitudinally extending slots or clefts at its lower end to permit the expansion of the member as it passes over the bottle neck, a plunger rod working through said plunger and carrying a head lying within the slotted portion of the tubular member, a spring for moving said rod independently of the tubular member and plunger, means connected to the upper part of said rod, and acting against the plunger to hold said rod elevated and the aforesaid spring under compression, and means connected to the plunger for operating the same.

6. In a bottle capping machine the combination of a reciprocating tubular member comprising resilient spring fingers provided with crimping ribs; a head member yieldably disposed in said tubular member; and means for locking said tubular member with respect to said head member; substantially as described.

7. In a bottle capping machine the combination of a tubular member comprising resilient spring fingers provided with crimping ribs adapted to encircle the flange of a bottle cap; a head member yieldably disposed in said tubular member and adapted to bear upon the upper surface of said cap; means for reciprocating said tubular member; and means for locking said member in its adjusted position with respect to said head member; substantially as described.

8. In a bottle capping machine for placing caps having flanges in locking engagement with bottle heads the combination of a tubular member comprising resilient spring fingers having crimping ribs adapted to wipe down along and to stretch the flange of the bottle cap to be operated upon; a cap holding head member yieldably disposed in said tubular member, and having a diameter greater than that of said crimping ribs, when in their lower position, said tubular member being cut away above said ribs to accommodate said head member; means to reciprocate said ribs past said head member; and means to lock said ribs when in their adjusted position; substantially as described.

9. In a bottle capping machine for placing flanged caps on bottle heads provided with locking shoulders, the combination of a reciprocating tubular member comprising resilient spring fingers having a plurality of circularly arranged crimping members adapted to wipe down along and to bend and stretch the flange of a bottle cap; a head member adapted to firmly press the cork of said cap down into intimate contact with the extreme upper rim of the bottle head and to prevent the metal from buckling when the said ribs are stretching the said flange; said fingers being cut away above said ribs to permit the latter to snap in under said head member and under the shoulder on the bottle head; and means to lock said clefts in this latter position; substantially as described.

10. In a bottle capping machine the combination of the split tubular member comprising a plurality of spring fingers having the circularly arranged crimping ribs 27, the inclines below said ribs; the incline 28 above said ribs; the head member 34 of a larger diameter than said ribs and adapted to be surrounded by the inclines 28; and means to reciprocate said ribs 27 into and out of engagement with said head member; substantially as described.

11. In a bottle capping machine for placing caps having flanges in locking engagement with bottle heads, the combination of a plunger; a tubular member comprising integral resilient spring fingers having crimping ribs adapted to wipe down along and to stretch the flange of the bottle cap to be operated upon; means for rigidly securing said tubular member to said plunger; a cap holding member passing through said plunger; and means for yieldably holding the same in said tubular member; said tubular member being cut away above said ribs to accommodate said head member; substantially as described.

12. In a bottle capping machine for placing flanged caps on bottle heads provided with locking shoulders, the combination of a reciprocating plunger; a tubular member comprising integral resilient spring fingers having a plurality of circularly arranged crimping members adapted to wipe down along and to bend and stretch the flange of a bottle cap; means rigidly securing said tubular member and said plunger together; a head member passing through said plunger and adapted to firmly press the cork of said cap down into intimate contact with the extreme upper rim of the bottle head and to prevent the metal from buckling when the said ribs are stretching the said flange; said fingers being cut away above said ribs to permit the latter to snap in under the shoulder on the bottle head; and means to reciprocate said tubular member with respect to said head member; substantially as described.

In testimony whereof I affix my signature in the presence of two witnesses.

THOMAS J. LEVEY.

Witnesses:

T. A. WITHERSPOON,

MARTIN SCHNEIDER.